United States Patent
Benammar et al.

(10) Patent No.: US 11,764,866 B2
(45) Date of Patent: Sep. 19, 2023

(54) SYSTEMS AND METHODS TO MINIMIZE HANDOVER INTERRUPTION TIME

(71) Applicant: Hughes Network Systems, LLC, Germantown, MD (US)

(72) Inventors: Nassir Benammar, Rockville, MD (US); Channasandra Ravishankar, Clarksburg, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 85 days.

(21) Appl. No.: 17/564,469

(22) Filed: Dec. 29, 2021

(65) Prior Publication Data

US 2023/0208512 A1    Jun. 29, 2023

(51) Int. Cl.
*H04B 7/185* (2006.01)
*H04W 36/16* (2009.01)
*H04W 28/06* (2009.01)
*H04W 84/06* (2009.01)

(52) U.S. Cl.
CPC ........ *H04B 7/18541* (2013.01); *H04W 28/06* (2013.01); *H04W 36/16* (2013.01); *H04W 84/06* (2013.01)

(58) Field of Classification Search
CPC .. H04B 7/18541; H04W 28/06; H04W 36/16; H04W 84/06
See application file for complete search history.

(56) References Cited

U.S. PATENT DOCUMENTS

| | | |
|---|---|---|
| 2008/0220771 A1 | 9/2008 | Agarwal et al. |
| 2013/0114408 A1 | 5/2013 | Sastry et al. |
| 2017/0041830 A1 | 2/2017 | Davis et al. |
| 2019/0053119 A1 | 2/2019 | Benammar et al. |

FOREIGN PATENT DOCUMENTS

WO     2020154744 A1    7/2020

OTHER PUBLICATIONS

International Search Report and Written Opinion dated Apr. 10, 2023 in corresponding International Application No. PCT/US22/53860.

*Primary Examiner* — Ashley Shivers
(74) *Attorney, Agent, or Firm* — GLOBAL IP COUNSELORS, LLP (57) ABSTRACT

Satellite communication systems and methods are disclosed herein. In an embodiment, a satellite communication system includes a user terminal and a gateway. The user terminal includes a terminal antenna and a terminal controller. The terminal antenna enables the user terminal to communicate via each of a first satellite and a second satellite. The gateway includes a gateway antenna and a gateway controller. The gateway antenna enables the gateway to communicate with the user terminal via each of the first satellite and the second satellite. At least one of the terminal controller and the gateway controller is configured to adjust a queue management policy during a handover operation from the first satellite to the second satellite.

20 Claims, 3 Drawing Sheets

FIG. 4 ately point to the target satellite and synchs to the downlink signal, which reduces the handover time versus, for example, using the worst-case satellite handover time and having the user terminal wait for an uplink allocation through the target satellite.
SYSTEMS AND METHODS TO MINIMIZE HANDOVER INTERRUPTION TIME

BACKGROUND

Field of the Invention

The present disclosure generally relates to systems and methods to minimize handover interruption time. In particular, the present disclosure relates to satellite communication systems and methods configured to mitigate the impact of a disruption in service during a satellite handover operation.

Background Information

Low earth orbit (LEO) and medium earth orbit (MEO) satellite communication systems often require user terminals to handover from one satellite to another satellite. This also applies to satellite handover between non-geostationary (NGSO) and geostationary orbit (GSO) satellites. When the user terminal has multiple antennas, this handover operation is possible without the user terminal experiencing an interruption in service. However, user terminals with a single antenna can experience interruptions in service during the satellite handover due to the time it takes the antenna to readjust and point to the target satellite. The interruption time can vary from hundreds of milliseconds to a few seconds depending on a various factors including the constellation type, the number of satellites in a constellation, and the antenna's capabilities (e.g., how quickly the antenna moves). The interruptions can result in various problems besides just the time, for example, causing packets to be dropped and/or service rates for the user terminal to be decreased (e.g., a TCP slow start).

SUMMARY

The present disclosure provides systems and methods that improve the quality of experience of a user terminal susceptible to interruptions due to satellite handover operations. For example, the disclosed systems and methods improve the quality of experience of end users and the overall throughput of applications by adjusting the packet drop policy service as a user terminal shifts from one satellite to another satellite.

Transmission Control Protocol (TCP) has few features (e.g., TCP spurious retransmission timeout and detection) that tolerate an interruption in transmission but will be negatively impacted by packet losses/drops. Queue management policies that drop packets based on packet queue delay can negatively impact the performance of TCP throughput once the connection resumes at the target satellite. For example, packet losses can result in a reduction of the TCP window size, affecting the allowed number of packets in transit without acknowledgment, which directly correlates to the achievable throughput. During a satellite handover operation, the packet queue experiences a higher delay, but not a build up as the TCP transmission stalls due to lack of TCP ACK in the opposite direction. The systems and methods of the present disclosure are configured to maintain TCP transmit window size (or reduce the impact on the window size) once the connection re-establishes at the target satellite to allow for a better throughput.

In an embodiment, the systems and methods of the present disclosure mitigate the impact of a service interruption during a satellite handover by altering a queue management policy, for example, by not dropping packets due to an added queuing delay. These systems and methods can apply to the queue management at a satellite gateway and can apply to a subset of data flows based on QoS (Quality of Service), packet error rate, delay and jitter sensitivity. A user terminal can also be configured to adjust or suspend discarding packets due to higher delays experience during satellite handover operations. Additionally, these systems and methods can expedite a satellite handover operation by allowing a user terminal to send a random access channel (RACH) and identify itself using a target satellite once it points to the target satellite and synchs to the downlink signal, which reduces the handover time versus, for example, using the worst-case satellite handover time and having the user terminal wait for an uplink allocation through the target satellite.

In view of the state of the known technology, one aspect of the present disclosure is to provide a satellite communication system. The satellite communication system includes a user terminal and a gateway. The user terminal includes a terminal antenna and a terminal controller. The terminal antenna enables the user terminal to communicate via each of a first satellite and a second satellite. The gateway includes a gateway antenna and a gateway controller. The gateway antenna enables the gateway to communicate with the user terminal via each of the first satellite and the second satellite. At least one of the terminal controller and the gateway controller is configured to adjust a queue management policy during a handover operation from the first satellite to the second satellite.

Another aspect of the present disclosure is to provide a satellite communication method. The method includes determining that a user terminal should perform a handover operation from a first satellite to a second satellite, sending a handover communication to the user terminal via the first satellite, the handover communication including instructions to perform the handover operation, adjusting a queue management policy relating to transfer of data packets with the user terminal during the handover operation, and establishing contact with the user terminal via the second satellite.

Another aspect of the present disclosure is to provide another satellite communication method. The satellite communication method includes receiving a handover communication from a gateway via a first satellite, the handover communication including instructions regarding a handover operation from the first satellite to a second satellite, adjusting a queue management policy relating to transfer of data packets with the gateway during the handover operation, and establishing contact with the gateway via the second satellite.

Also, other objects, features, aspects and advantages of the disclosed devices, systems and methods will become apparent to those skilled in the art in the field of satellite systems from the following detailed description, which, taken in conjunction with the annexed drawings, discloses preferred embodiments of devices, systems and methods with various features.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
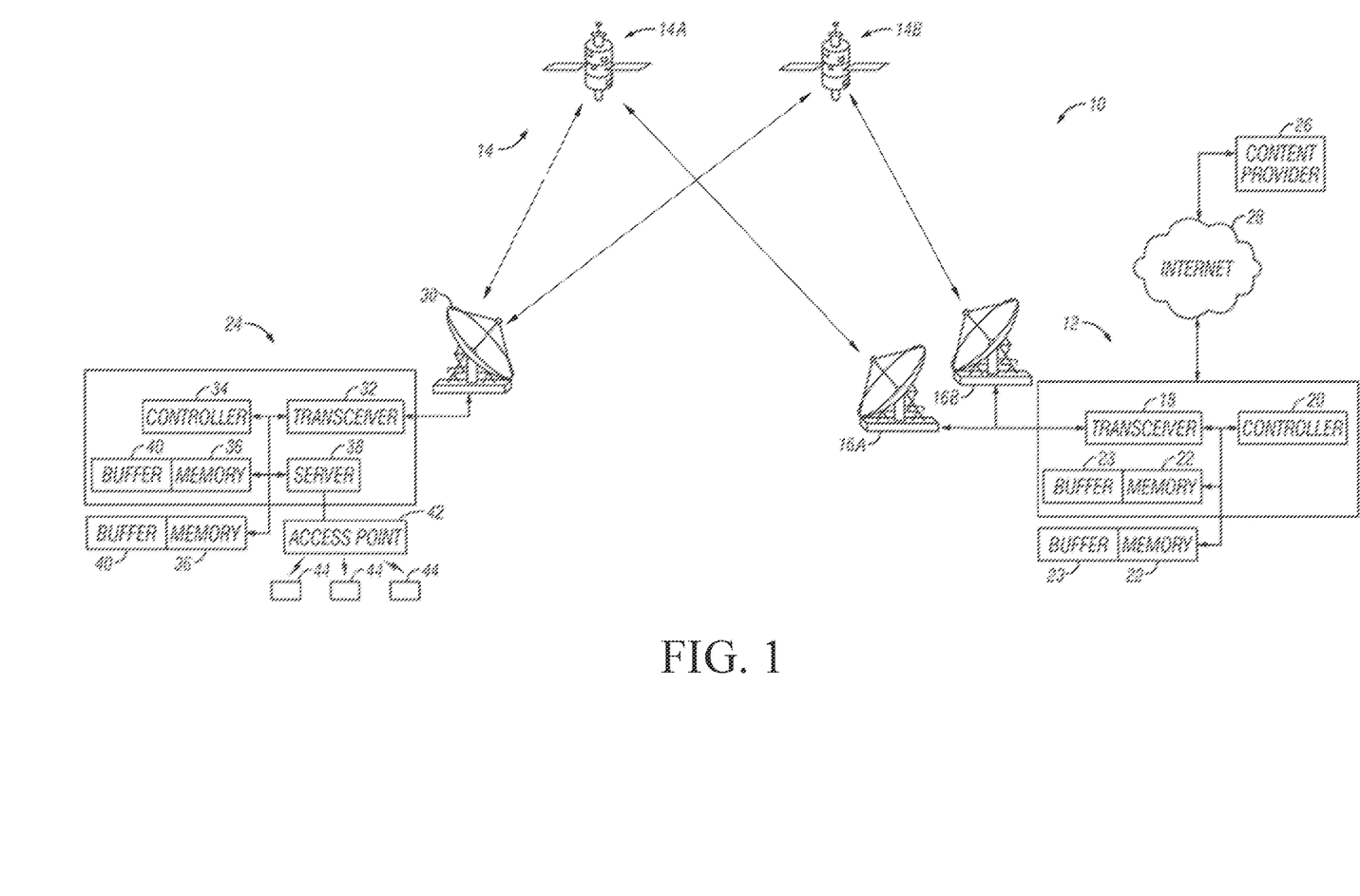
FIG. 1 illustrates an example embodiment of a satellite communication system in accordance with the present disclosure.

FIG. 1 illustrates an example embodiment of a satellite communication system 10 in accordance with the present disclosure. In an embodiment, the satellite communication system 10 can be a low earth orbit (LEO) satellite communication system. The satellite communication system 10 can also be a medium earth orbit (MEO) satellite communication system, a geosynchronous equatorial orbit (GEO) satellite communication system, a hybrid LEO, MEO and/or GEO satellite communication system, or any other satellite communication system which performs a satellite handover operation as described herein.

In the illustrated embodiment, the satellite communication system 10 includes one or more terrestrially mounted gateway 12 that communicates with one or more user terminal 24 via a plurality of orbiting satellites 14. In FIG. 1, the plurality of orbiting satellites 14 includes a first satellite 14A and a second satellite 14B. The present disclosure is advantageous, for example, when a handover operation is performed from the first satellite 14A to the second satellite 14B, or vice versa. Those of ordinary skill in the art will recognize from this disclosure that a typical satellite communication system 10 will include more than two satellites 14, but FIG. 1 only shows two satellites 14 for simplicity. The methods of the present disclosure discussed below describe a handover operation from the first satellite 14A to the second satellite 14B, meaning that the first satellite 14A is the source satellite and the second satellite 14B is the target satellite.

As illustrated in FIG. 1, the gateway 12 can include one or more antenna 16, a transceiver 18, a controller 20, a memory 22 and other types of equipment (not shown) such as amplifiers, waveguides and so on as understood in the art which enable communication between the gateway 12 and one or more user terminal 24 via the plurality of satellites 14. The antenna 16 enables the gateway 12 to communicate via each of the first satellite 14A and the second satellite 14B. The antenna 16 can include multiple antennas 16A, 16B. For example, in the illustrated embodiment, the gateway 12 includes a first antenna 16A communicating with the first satellite 14A and a second antenna 16B communicating with the second satellite 14B. The memory 22 can be, for example, an internal memory in the gateway 12, or other types of memory devices such as flash memory or hard drives with external high speed interface such as a USB bus or an SATA bus, or remote memories such as cloud storage and so on. These other types of memory can be present at the gateway 12 or accessible at a location apart from the gateway 12 via a network connection such as an Ethernet connection, a WiFi connection or any other suitable type of connection as understood in the art. Also, the memory 22 can include at least one buffer 23 which is configured to buffer, for example, data packets to be sent by the gateway 12.

As understood in the art, the controller 20 preferably includes a microcomputer with a control program that controls the gateway 12 as discussed herein. The controller 20 can also include other conventional components such as an input interface circuit, an output interface circuit, and storage devices such as a ROM (Read Only Memory) device and a RAM (Random Access Memory) device. The RAM and ROM store processing results and control programs that are run by the controller 20. The controller 20 is operatively coupled to the components of the gateway 12 as appropriate, in a conventional manner. It will be apparent to those skilled in the art from this disclosure that the precise structure and algorithms for the controller 20 can be any combination of hardware and software that will carry out the functions of the present invention. The controller 20 can be referred to as the "gateway controller" herein in comparison to one or more controller controlling a user terminal 24.

In an embodiment, the controller 20 is configured to manage a data packet queue at the gateway 12. In an embodiment, the controller 20 is configured to manage the data packet queue in accordance with a queue management policy stored by the memory 22. In an embodiment, the queue management policy defines one or more rules for controlling a data packet queue at the gateway 12. More specifically, the queue management policy defines one or more rules for dropping data packets during a transmission delay. The controller 20 is configured to manage the queue management policy, for example, by adjusting the queue management policy so as to not drop data packets during a transmission delay and/or by adjusting an amount of time to wait before dropping packets during a transmission delay. In an embodiment, the controller 20 is configured to manage the queue management policy so that different types of data packets are treated differently (e.g., not dropped or have different dropping times during a transmission delay). For example, the controller 20 can manage different types of data packets based on QoS, packet error rate, delay, jitter sensitivity, or other factors.

In an embodiment, the controller 20 includes a discard timer for specific flow (i.e. radio bearer in 3gpp) that indicates the maximum time a packet should be queued before it gets discarded. In an embodiment, the discard timer includes a PDCP (packet data convergence protocol) discard timer in RRC (range rate correction) of 3GPP (3rd Generation Partnership Project). In an embodiment, the controller 20 is configured to manage the data packet queue at the gateway 12 using the discard timer. As described in more detail below, the controller 20 is configured to suspend the discard timer or allow a higher queuing delay during a satellite handover interruption so no packet can be sent to or received from the user terminal 24 during that time.

The gateway 12, the plurality of satellites 14 and the user terminal 24 typically communicate with each other over a radio frequency link, such as a Ku-band link, a Ka-band link or any other suitable type of link as understood in the art, which can generally be referred to as a space link. In an embodiment, the gateway 12 can include or be configured as an inroute group manager, which can be configured to control the bandwidth allocations to the terminal 24 (e.g., on an inroute or inroute group basis), and to correspondingly control and administer the bandwidth allocation approaches. Also, the gateway 12 can include or be configured as a network management system, which, among other things, operates to communicate with remote sites, such as web content providers 26, via the Internet 28, cloud storage, or other communication networks as understood in the art. In addition, gateways 12 can communicate with each other via, for example, the Internet 28 or other communication networks. The satellite communication system 10 will typically include a plurality of gateways 12 and a plurality of terminals 24.

As illustrated in FIG. 1, a terminal 24 typically includes an antenna dish 30, a transceiver 32, a controller 34, a memory 36, a local server 38 and other types of equipment (not shown) such as amplifiers, waveguides and so on as understood in the art which enable communication between the terminal 24 and one or more gateway 12 via the plurality of orbiting satellites 14. A transceiver 32 can include, for example, an integrated satellite modem and any other suitable equipment which enables the transceiver 32 to communicate with one or more of the orbiting satellites 14 as understood in the art. The memory 36 can be, for example, an internal memory in the terminal 24, or other types of memory devices such as a flash memory or hard drives with external high speed interface such as a USB bus or an SATA bus, or remote memories such as cloud storage and so on. These other types of memory can be present at the terminal 24 or accessible at a location apart from the terminal 24 via a network connection such as an Ethernet connection, a WiFi connection or any other suitable type of connection as understood in the art. Moreover, the memory 36 can include at least one buffer 40 which is configured to buffer, for example, received data packets included in communication signals transmitted from the gateway 12. Also, the local server 38 can communicate with an access point 42, such as a wireless application protocol (WAP) or any other suitable device, which enables the local server 38 to enable end user devices 44 to access the data network, for example, via data packets. Such end user devices 44 include, for example, desktop computers, laptop or notebook computers, tablets (e.g., iPads), smart phones, smart TVs and any other suitable devices as understood in the art. Naturally, the communications between the local server 38, the access point 42 and the end user devices 44 can occur over wireless connections, such as WiFi connections, as well as wired connections as understood in the art.

As with the controller 20 for a gateway 12, the controller 34 preferably includes a microcomputer with a control program that controls the terminal 24 as discussed herein. The controller 34 can also include other conventional components such as an input interface circuit, an output interface circuit, and storage devices such as a ROM (Read Only Memory) device and a RAM (Random Access Memory) device. The RAM and ROM store processing results and control programs that are run by the controller 34. The controller 34 is operatively coupled to the components of the terminal 24 as appropriate, in a conventional manner. It will be apparent to those skilled in the art from this disclosure that the precise structure and algorithms for the controller 34 can be any combination of hardware and software that will carry out the functions of the embodiments of the present invention. The controller 34 can be referred to as the "terminal controller" herein in comparison to one or more controller controlling a gateway 12.

In an embodiment, the controller 34 is configured to manage a data packet queue at the user terminal 24. In an embodiment, the controller 34 is configured to manage the data packet queue in accordance with a queue management policy stored by the memory 36. In an embodiment, the queue management policy defines one or more rules for controlling a data packet queue at the user terminal 24. More specifically, the queue management policy defines one or more rules for dropping data packets during a transmission delay. The controller 34 is configured to manage the queue management policy, for example, by adjusting the queue management policy so as to not drop data packets during a transmission delay and/or by adjusting an amount of time to wait before dropping packets during a transmission delay. In an embodiment, the controller 34 is configured to manage the queue management policy so that different types of data packets are treated differently (e.g., not dropped or have different dropping times during a transmission delay). For example, the controller 34 can manage different types of data packets based on QoS, packet error rate, delay, jitter sensitivity, or other factors.

In an embodiment, the controller 34 includes a discard timer for specific flow (i.e. radio bearer in 3gpp) that indicates the maximum time a packet should be queued before it gets discarded. In an embodiment, the discard timer includes a PDCP (packet data convergence protocol) discard timer in RRC (range rate correction) of 3GPP (3rd Generation Partnership Project). In an embodiment, the controller 34 is configured to manage the data packet queue at the user terminal 24 using the discard timer. As described in more detail below, the controller 34 is configured to suspend the discard timer or allow a higher queuing delay during a satellite handover interruption so no packet can be sent to or received from the gateway 12 during that time.

In the illustrated embodiment, the user terminal 24 includes a single antenna 30. The antenna 30 enables the user terminal 24 to communicate via each of the first satellite 14A and the second satellite 14B. The antenna 30 is configured to be mechanically adjusted to enable communication with the gateway 12 via the first satellite 14A or the second satellite 14B. In an embodiment, the antenna 30 is a single parabolic antenna. In an embodiment, the antenna 30 is a unidirectional antenna. The controller 34 is configured to control the adjustments, for example, by controlling a motor of the antenna 30 based on information regarding the locations of the satellites 14A, 14B received from the gateway 12. The present disclosure is advantageous during periods when the antenna 30 is required to move (handover operation) from the first satellite 14A to the second satellite 14B, or vice versa. The antenna 30 can be referred to as the "terminal antenna" herein in comparison to the antenna 16 at the gateway 12. Likewise, the antenna 16 can be referred to as the "gateway antenna" herein in comparison to the antenna 30 at the user terminal 24.

Figure 2:
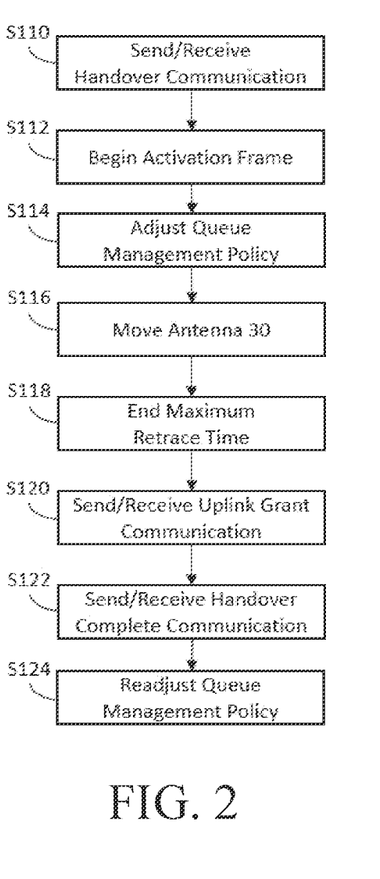
FIG. 2 illustrates an example embodiment of a satellite communication method according to the present disclosure.
Figure 3:
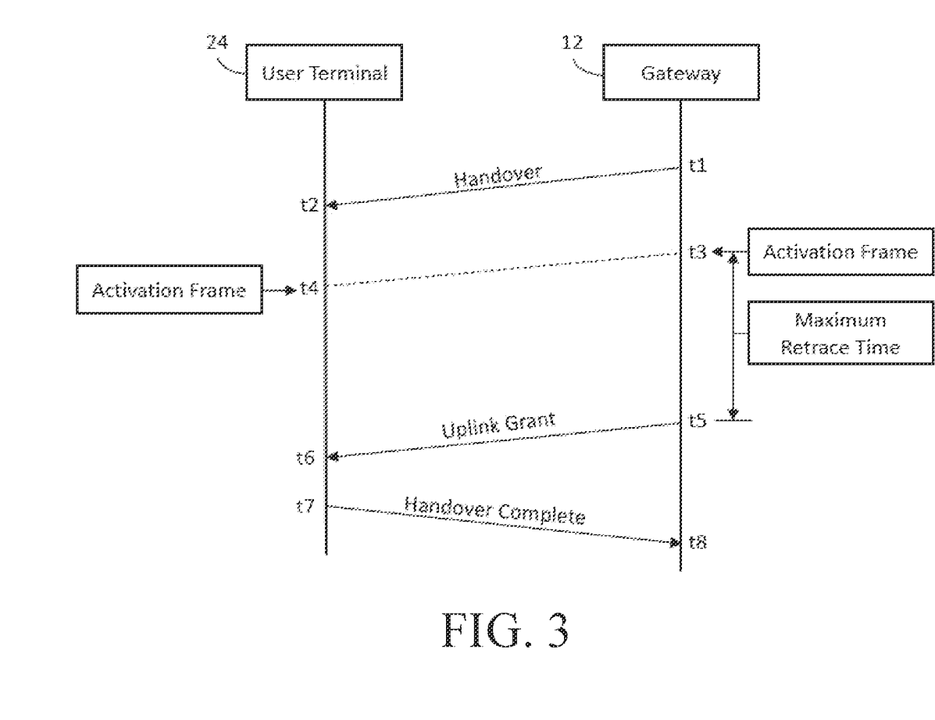
FIG. 3 illustrates the communications between a gateway and a user terminal during the method of FIG. 2.

FIGS. 2 and 3 illustrate an example embodiment of a satellite communication method 100 according to the present disclosure. Some or all of the steps of the method 100 can be stored as instructions on the memory 22 and/or the memory 36 and can be executed by the controller 20 and/or the controller 34 in accordance with the respective instructions stored on the memory 22 and/or the memory 36. It should be understood that some of the steps described herein can be reordered or omitted without departing from the spirit or scope of method 100.

At step S110, the gateway 12 has determined that the user terminal 24 must perform a handover operation from the first satellite 14A to the second satellite 14B, for example, because the orbit of the first satellite 14A is taking it out of range of the user terminal 24 while the orbit of the second satellite 14B is bringing it into range of the user terminal 24. The gateway 12 sends the user terminal 24 a handover communication. More specifically, the gateway 12 sends the handover communication (e.g., at time t1 in FIG. 3) to the user terminal 24 by communicating via the first satellite 14A. Likewise, the user terminal 24 receives the handover message (e.g., at time t2 in FIG. 3) from the gateway 12 by communicating via the first satellite 14A.

The handover communication includes instructions regarding the handover operation from the first satellite 14A to the second satellite 14B. The handover communication instructions can include information about the orbit of the second satellite 14B so that the controller 34 can properly control the antenna 30 to move so as to point toward the second satellite 14B. The handover communication instructions can also include information regarding an activation frame. The handover communication instructions can also include instructions for managing the queue management policy at the user terminal 24. More specifically, the handover communication instructions can include instructions for adjusting the queue management policy, for example, so as to not drop data packets during handover/retrace time and/or by adjusting an amount of time to wait before dropping packets during an activation frame. In an embodiment, the instructions for adjusting the queue management policy include a discard time value (e.g., DDCP discard time value) that is specific to different flows based on QoS. The handover communication can also include a RACH instruction and/or user terminal identifier for the user terminal 24 to use once a connection with the second satellite 14B has been established.

In an embodiment, the handover communication instructions include information regarding the activation frame. The activation frame includes the time period for the handover operation. That is, the activation frame takes into account the time period during which the antenna 30 moves from pointing toward the first satellite 14A to pointing toward the second satellite 14B. In an embodiment, the instructions regarding the activation frame include the start time (or frame number) of the activation frame. The start time of the activation frame can be the initial time in which the antenna 30 should begin to move from pointing toward the first satellite 14A to pointing toward the second satellite 14B. In an embodiment, the instructions can be based on the maximum retrace time for the handover operation from the first satellite 14A to the second satellite 14B. In an embodiment, retrace time is based on user terminal capability, a position of the satellite 14, and/or the pointing arc between a source satellite 14 to target. User terminal antenna capability can be shared by the user terminal 24 and sent to the gateway 12. The maximum retrace time can be maximum amount of time it should take for the antenna 30 to move from pointing toward the first satellite 14A to pointing toward the second satellite 14B. The maximum retrace time can vary, for example, based on user terminal antenna capability and depending on whether the retrace is toward a satellite 14 on the same orbit, a satellite 14 on another orbit, a satellite 14 on another constellation (from LEO or MEO for example), etc. The retrace time usually improves with the buildup of the satellite constellation. The actual time for the antenna 30 to complete the handover operation can be less than the maximum retrace time. In an embodiment, the instructions can be based on the end time of the activation frame. The end time of the activation frame can be the final time of the activation frame at which time the antenna 30 should be ready to communicate with the gateway 12 via the second satellite 14B.

In an embodiment, the gateway 12 calculates the retrace time based on one or more of the position or movement of the first satellite 14A, the position or movement of the second satellite 14B, the position of the user terminal 24, and/or the capabilities (e.g., movement speed) of the antenna 30. In an embodiment, the retrace time can be preset at the gateway. In an embodiment, the controller 20 is configured to select a preset retrace time from a plurality of preset retrace times, for example, based on one or more of the above factors.

In an embodiment, the handover communication instructions include instructions regarding how the controller 34 manages the queue management policy at the user terminal 24. The instructions can cause the controller 34 to adjust the queue management policy. The adjustment can be to suspend the discard timer during the handover operation. The adjustment can be to allow a higher maximum allowed queuing delay during the handover operation. The instructions can include a discard time value that is specific to different flows based on QoS. The instructions can include an added queuing delay to account for service interruption and prevent packet drops. The added time can flow (radio bearer) specific and/or based on the flow QoS. The added time can be based on the discard time value that is specific to different flows based on QoS.

At step S112, the activation frame begins. As seen in FIG. 3, the activation frame can begin at slightly different times in relation to each of the gateway 12 and the user terminal 24 depending on how long a communication takes to transmit from the gateway 12 to the user terminal 24. In FIG. 3, the gateway 12 begins the activation frame at time t3, while the user terminal 24 begins the activation frame at time t4.

At step S114, the gateway 12 and/or the user terminal 24 adjusts its queue management policy. More specifically, the user terminal 24 adjusts its queue management policy based on the instructions in the handover communication. In an embodiment, the gateway 12 is configured to mimic the instructions provided to the user terminal 24, such that the controller 20 and the controller 34 adjust their respective queue management policies in the same way during the handover operation. In an alternative embodiment, the controller 20 and the controller 34 adjust their respective queue management policies in different ways during the handover operation. In an embodiment, step S114 can be performed at the about same time as step S112. Alternatively, step S114 can be performed before step S112.

In an embodiment, the gateway 12 is configured to adjust its queue management policy at step S114. More specifically, the controller 20 adjusts the queue management policy at the gateway 12. The controller 20 adjusts the queue management policy relating to transfer of data packets with the user terminal 24 during the handover operation. In an embodiment, the controller 20 is configured to adjust the queue management policy by suspending the discard timer. In an embodiment, the controller 20 is configured to adjust the queue management policy by adjusting a queuing delay so that packets are held longer before being discarded. In an embodiment, the controller 20 is configured to adjust the queue management policy for different types of packets based on QoS. In an embodiment, the controller 20 is configured to adjust the queue management policy for different types of packets based on the flow (radio bearer).

In an embodiment, the user terminal 24 is configured to adjust its queue management policy at step S114. More specifically, the controller 34 adjusts the queue management policy at the user terminal 24. The controller 34 adjusts the queue management policy relating to transfer of data packets with the gateway 12 during the handover operation. In an embodiment, the controller 34 is configured to adjust the queue management policy by suspending the discard timer. In an embodiment, the controller 34 is configured to adjust the queue management policy by adjusting a queuing delay so that packets are held longer before being discarded. In an embodiment, the controller 34 is configured to adjust the queue management policy for different types of packets based on QoS. In an embodiment, the controller 34 is configured to adjust the queue management policy for different types of packets based on the flow (radio bearer).

At step S116, the antenna 30 moves from pointing toward the first satellite 14A to pointing toward the second satellite 14B. In FIG. 3, the movement begins at time t4 when the activation frame begins for the user terminal 24. The actual time needed for the antenna 30 to complete the handover can be unknown at this time. As the handover operation is completed, there is an interruption in communication between the gateway 12 and the user terminal 24. The controller 34 is configured to cause the movement of the antenna 30, for example, by controlling a motor of the antenna 30. The controller 34 retraces and tunes to the second satellite 14B at step S116.

At step S118, the maximum retrace time ends. As seen in FIG. 3, the maximum retrace time ends at the gateway 12 at time t5. The gateway 12 and the user terminal 24 then establish contact via the second satellite 14B.

At step S120, the gateway 12 sends the user terminal 24 an uplink grant communication. More specifically, the gateway 12 sends the uplink grant communication (e.g., at time t5 in FIG. 3) to the user terminal 24 by communicating via the second satellite 14B. Likewise, the user terminal 24 receives the uplink grant communication (e.g., at time t6 in FIG. 3) from the gateway 12 by communicating via the second satellite 14B. The uplink grant can include a unique identifier.

In an embodiment, the user terminal 24 retunes to the second satellite 14B and sends a communication to the gateway 12 prior to expiration of the retrace time at step S118 and/or prior to the uplink grant communication at step S120. In an embodiment, the communication from the user terminal is a RACH communication. In an embodiment, the RACH communication is in response to information from the handover communication at step S110. This embodiment can be performed, for example, by proceeding according to step S218 of the method 200 discussed below.

At step S122, the user terminal 24 sends the gateway 12 a handover complete communication. More specifically, the user terminal 24 sends the handover complete communication (e.g., at time t7 in FIG. 3) to the gateway 12 by communicating via the second satellite 14B. Likewise, the gateway 12 receives the handover complete communication (e.g., at time t8 in FIG. 3) from the user terminal 24 by communicating via the second satellite 14B.

At step S124, the gateway 12 and/or the user terminal 24 readjusts its queue management policy. The gateway 12 and/or the user terminal 24 can readjust the queue management policy so that the queue management policy reverts to the configuration prior to step S114.

In an embodiment, the gateway 12 is configured to readjust its queue management policy at step S124. More specifically, the controller 20 readjusts the queue management policy at the gateway 12. In an embodiment, the controller 20 is configured to readjust the queue management policy by reactivating the discard timer. In an embodiment, the controller 20 is configured to readjust the queue management policy by adjusting the queuing delay so that packets are held for less time before being discarded. In an embodiment, the controller 20 is configured to readjust the queue management policy for different types of packets based on QoS. In an embodiment, the controller 20 is configured to readjust the queue management policy for different types of packets based on the flow (radio bearer).

In an embodiment, the user terminal 24 is configured to readjust its queue management policy at step S124. More specifically, the controller 34 readjusts the queue management policy at the user terminal 24. In an embodiment, the controller 34 is configured to readjust the queue management policy by reactivating the discard timer. In an embodiment, the controller 34 is configured to readjust the queue management policy by adjusting a queuing delay so that packets are held for less time before being discarded. In an embodiment, the controller 34 is configured to readjust the queue management policy for different types of packets based on QoS. In an embodiment, the controller 34 is configured to readjust the queue management policy for different types of packets based on the flow (radio bearer).

The satellite communication system 10 is configured to perform the method 100 each time a satellite handover occurs. This way, there is no noticeable disruption to users at the user terminal 24 during the satellite handovers. This prevents disruptions to service (e.g., service rates for the user terminal 24 to be decreased) after handover operations due to data packets being dropped based on a perceived queuing delay.

Figure 4:
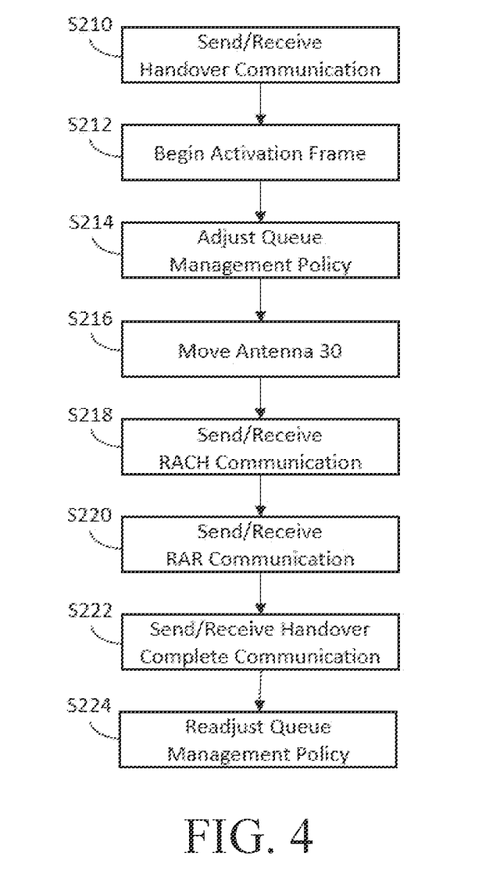
FIG. 4 illustrates an example embodiment of a satellite communication method according to the present disclosure.
Figure 5:
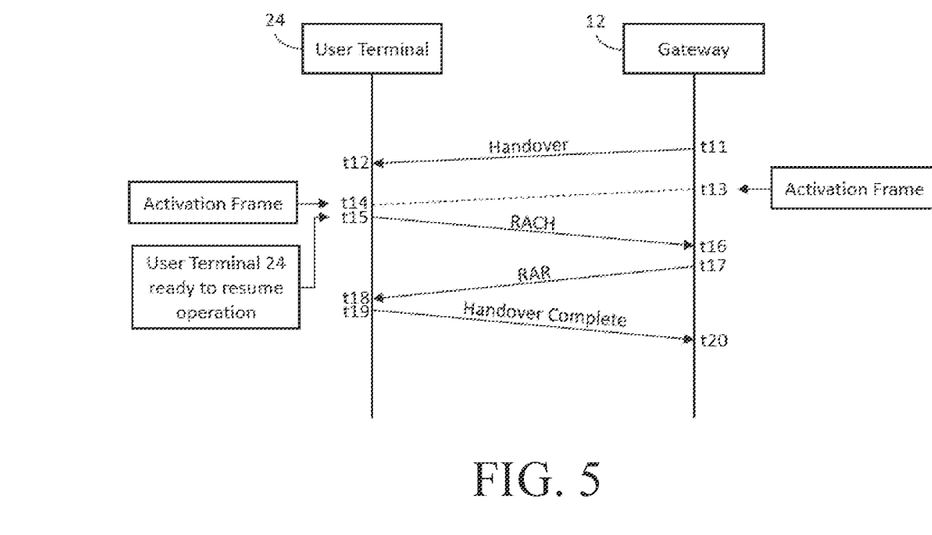
FIG. 5 illustrates the communications between a gateway and a user terminal during the method of FIG. 4.

FIGS. 4 and 5 illustrate an example embodiment of a satellite communication method 200 according to the present disclosure. Some or all of the steps of method 200 can be stored as instructions on the memory 22 and/or the memory 36 and can be executed by the controller 20 and/or the controller 34 in accordance with the respective instructions stored on the memory 22 and/or the memory 36. It should be understood that some of the steps described herein can be reordered or omitted without departing from the spirit or scope of method 200. The method 200 can be performed in combination with or as an alternative to the method 100 described herein.

At step S210, the gateway 12 has determined that the user terminal 24 must perform a handover operation from the first satellite 14A to the second satellite 14B, for example, because the orbit of the first satellite 14A is taking it out of range of the user terminal 24 while the orbit of the second satellite 14B is bringing it into range of the user terminal 24. The gateway 12 sends the user terminal 24 a handover communication. More specifically, the gateway 12 sends the handover communication (e.g., at time t11 in FIG. 5) to the user terminal 24 by communicating via the first satellite 14A. Likewise, the user terminal 24 receives the handover message (e.g., at time t12 in FIG. 5) from the gateway 12 by communicating via the first satellite 14A.

The handover communication includes instructions regarding the handover operation from the first satellite 14A to the second satellite 14B. The handover communication instructions can include information about the orbit of the second satellite 14B so that the controller 34 can properly control the antenna 30 to move so as to point toward the second satellite 14B. The handover communication instructions can also include information regarding an activation frame. The handover communication instructions can also include instructions for managing the queue management policy at the user terminal 24. More specifically, the handover communication instructions can also include instructions for adjusting the queue management policy, for example, so as to not drop data packets during an activation frame and/or by adjusting an amount of time to wait before dropping packets during an activation frame. In an embodiment, the instructions for adjusting the queue management policy include a discard time value (e.g., PDCP discard time value) that is specific to different flows based on QoS. The handover communication can also include a RACH instruction and/or user terminal identifier for the user terminal 24 to use once a connection with the second satellite 14B has been established.

In an embodiment, the handover communication instructions include information regarding the activation frame. The activation frame includes the time period for the handover operation. That is, the activation frame takes into account the time period during which the antenna 30 moves from pointing toward the first satellite 14A to pointing toward the second satellite 14B. In an embodiment, the instructions regarding the activation frame include the start time (or frame number) of the activation frame. The start time of the activation frame can be the initial time in which the antenna 30 should begin to move from pointing toward the first satellite 14A to pointing toward the second satellite 14B. In an embodiment, the instructions can be based on the maximum retrace time for the handover operation from the first satellite 14A to the second satellite 14B. In an embodiment, retrace time is based on user terminal capability, a position of the satellite 14, and/or the pointing arc between a source satellite 14 to target. User terminal antenna capability can be shared by a user terminal 24 and sent to the gateway 12. The maximum retrace time can be maximum amount of time it should take for the antenna 30 to move from pointing toward the first satellite 14A to pointing toward the second satellite 14B. The maximum retrace time can vary, for example, based on user terminal antenna capability and depending on whether the retrace is toward a satellite 14 on the same orbit, a satellite 14 on another orbit, a satellite 14 on another constellation (from LEO or MEO for example), etc. The retrace time usually improves with the buildup of the satellite constellation. The actual time for the antenna 30 to complete the handover operation can be less than the maximum retrace time. In an embodiment, the instructions can be based on the end time of the activation frame. The end time of the activation frame can be the final time of the activation frame at which time the antenna 30 should be ready to communicate with the gateway 12 via the second satellite 14B.

In an embodiment, the gateway 12 calculates the retrace time based on one or more of the position or movement of the first satellite 14A, the position or movement of the second satellite 14B, the position of the user terminal 24, and/or the capabilities (e.g., movement speed) of the antenna 30. In an embodiment, the retrace time can be preset at the gateway. In an embodiment, the controller 20 is configured to select a preset retrace time from a plurality of preset retrace times, for example, based on one or more of the above factors.

In an embodiment, the handover communication instructions include instructions regarding how the controller 34 manages the queue management policy at the user terminal 24. The instructions can cause the controller 34 to adjust the queue management policy. The adjustment can be to suspend the discard timer during the handover operation. The adjustment can be to allow a higher queuing delay during the handover operation. The instructions can include a discard time value that is specific to different flows based on QoS. The instructions can include an added queuing delay to account for service interruption and prevent packet drops. The added time can flow (radio bearer) specific and/or based on the flow QoS. The added time can be based on the discard time value that is specific to different flows based on QoS.

At step S212, the activation frame begins. As seen in FIG. 5, the activation frame can begin at slightly different times in relation to each of the gateway 12 and the user terminal 24 depending on how long a communication takes to transmit from the gateway 12 to the user terminal 24. In FIG. 5, the gateway 12 begins the activation frame at time t13, while the user terminal 24 begins the activation frame at time t14.

At step S214, the gateway 12 and/or the user terminal 24 adjusts its queue management policy. More specifically, the user terminal 24 adjusts its queue management policy based on the instructions in the handover communication. In an embodiment, the gateway 12 is configured to mimic the instructions provided to the user terminal 24, such that the controller 20 and the controller 34 adjust their respective queue management policies in the same way during the handover operation. In an alternative embodiment, the controller 20 and the controller 34 adjust their respective queue management policies in different ways during the handover operation. In an embodiment, step S214 can be performed at the about same time as step S112. Alternatively, step S214 can be performed before step S212.

In an embodiment, the gateway 12 is configured to adjust its queue management policy at step S214. More specifically, the controller 20 adjusts the queue management policy at the gateway 12. The controller 20 adjusts the queue management policy relating to transfer of data packets with the user terminal 24 during the handover operation. In an embodiment, the controller 20 is configured to adjust the queue management policy by suspending the discard timer. In an embodiment, the controller 20 is configured to adjust the queue management policy by adjusting a queuing delay so that packets are held longer before being discarded. In an embodiment, the controller 20 is configured to adjust the queue management policy for different types of packets based on QoS. In an embodiment, the controller 20 is configured to adjust the queue management policy for different types of packets based on the flow (radio bearer).

In an embodiment, the user terminal 24 is configured to adjust its queue management policy at step S214. More specifically, the controller 34 adjusts the queue management policy at the user terminal 24. The controller 34 adjusts the queue management policy relating to transfer of data packets with the gateway 12 during the handover operation. In an embodiment, the controller 34 is configured to adjust the queue management policy by suspending the discard timer. In an embodiment, the controller 34 is configured to adjust the queue management policy by adjusting a queuing delay so that packets are held longer before being discarded. In an embodiment, the controller 34 is configured to adjust the queue management policy for different types of packets based on QoS. In an embodiment, the controller 34 is configured to adjust the queue management policy for different types of packets based on the flow (radio bearer).

At step S216, the antenna 30 moves from pointing toward the first satellite 14A to pointing toward the second satellite 14B. In FIG. 5, the movement begins at time t14 when the activation frame begins for the user terminal 24. The actual time needed for the antenna 30 to complete the handover operation can be unknown at this time. As the handover operation is completed, there is an interruption in communication between the gateway 12 and the user terminal 24. The controller 34 is configured to cause the movement of the antenna 30, for example, by controlling a motor of the antenna 30. The controller 34 retraces and tunes to the second satellite 14B at step S216. The gateway 12 and the user terminal 24 then establish contact via the second satellite 14B.

At step S218, the user terminal 24 sends the gateway 12 a RACH (Random Access Channel) communication. More specifically, the user terminal 24 sends the RACH communication (e.g., at time t15 in FIG. 5) to the gateway 12 by communicating via the second satellite 14B. Likewise, the gateway 12 receives the RACH communication (e.g., at time t16 in FIG. 5) from the user terminal 24 by communicating via the second satellite 14B. The RACH communication can include a unique identifier. The user terminal 24 can send the RACH communication after synching to the downlink signal of the second satellite 14B. In an embodiment, the RACH communication is in response to information from the handover communication at step S110.

At step S220, the gateway 12 sends the user terminal 24 a RAR communication. More specifically, the gateway 12 sends the RAR communication (e.g., at time t17 in FIG. 5) to the user terminal 24 by communicating via the second satellite 14B. Likewise, the user terminal 24 receives the RAR communication (e.g., at time t18 in FIG. 5) from the gateway 12 by communicating via the second satellite 14B. The RAR communication can include a unique identifier. In an embodiment, the RAR communication carries a grant with a specific allocation for the user terminal 24.

At step S222, the user terminal 24 sends the gateway 12 a handover complete message. More specifically, the user terminal 24 sends the handover complete message (e.g., at time t19 in FIG. 5) to the gateway 12 by communicating via the second satellite 14B. Likewise, the gateway 12 receives the handover complete message (e.g., at time t20 in FIG. 5) from the user terminal by communicating via the second satellite 14B. The handover complete communication can include the unique identifier from the RAR communication or another identifier related to the unique identifier from the uplink grant.

At step S224, the gateway 12 and/or the user terminal 24 readjusts its queue management policy. The gateway 12 and/or the user terminal 24 can adjusts its queue management policy so that the queue management policy reverts to the configuration prior to step S214.

In an embodiment, the gateway 12 is configured to readjust its queue management policy at step S224. More specifically, the controller 20 readjusts the queue management policy at the gateway 12. In an embodiment, the controller 20 is configured to readjust the queue management policy by reactivating the discard timer. In an embodiment, the controller 20 is configured to readjust the queue management policy by adjusting the queuing delay so that packets are held for less time before being discarded. In an embodiment, the controller 20 is configured to readjust the queue management policy for different types of packets based on QoS. In an embodiment, the controller 20 is configured to readjust the queue management policy for different types of packets based on the flow (radio bearer).

In an embodiment, the user terminal 24 is configured to readjust its queue management policy at step S224. More specifically, the controller 34 readjusts the queue management policy at the user terminal 24. In an embodiment, the controller 34 is configured to readjust the queue management policy by reactivating the discard timer. In an embodiment, the controller 34 is configured to readjust the queue management policy by adjusting a queuing delay so that packets are held for less time before being discarded. In an embodiment, the controller 34 is configured to readjust the queue management policy for different types of packets based on QoS. In an embodiment, the controller 34 is configured to readjust the queue management policy for different types of packets based on the flow (radio bearer).

The satellite communication system 10 is configured to perform the method 200 each time a satellite handover operation occurs. This way, there is no noticeable disruption to users at the user terminal during the satellite handover operations.

In an embodiment, the controller 20 is configured to use information from the handover operation to adjust future handover operations. For example, in an embodiment, the controller 20 is configured to use the timing of the handover operation to adjust future retrace times and/or related calculations. In this way, the system 10 optimizes subsequent satellite handover operations.

Although the illustrations imply a bent-pipe satellite architecture, it should be understood by those of ordinary skill in the art from this disclosure that these same techniques can also be used for on-board processing satellites.

Although the present disclosure illustrates and describes use of a single parabolic antenna, it should be understood by those of ordinary skill in the art from this disclosure that the methods described herein can also be advantageously applied to an electronically steered antenna or a hybrid (ESA over mechanical apparatus) antenna with non-negligible pointing time. Thus, in an embodiment, the antenna 30 can be an electronically steered antenna (ESA) or a hybrid antenna (a combination of a mechanically steered antenna and an electronically steered antenna) with non-negligible pointing time.

The embodiments described herein provide improved systems and methods for controlling a satellite handover operation. These systems and methods are advantageous, for example, because they mitigate the impact of a disruption in service during a satellite handover operation. It should be understood that various changes and modifications to the systems and methods described herein will be apparent to those skilled in the art and can be made without diminishing the intended advantages.

General Interpretation of Terms

In understanding the scope of the present invention, the term "comprising" and its derivatives, as used herein, are intended to be open ended terms that specify the presence of the stated features, elements, components, groups, and/or steps, but do not exclude the presence of other unstated features, elements, components, groups, integers and/or steps. The foregoing also applies to words having similar meanings such as the terms, "including", "having" and their derivatives. Also, the terms "part," "section," or "element" when used in the singular can have the dual meaning of a single part or a plurality of parts.

The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A satellite communication system comprising:
a user terminal including a terminal antenna and a terminal controller, the terminal antenna enabling the user terminal to communicate via each of a first satellite and a second satellite; and
a gateway including a gateway antenna and a gateway controller, the gateway antenna enabling the gateway to communicate with the user terminal via each of the first satellite and the second satellite,
at least one of the terminal controller and the gateway controller configured to adjust a queue management policy during a handover operation from the first satellite to the second satellite.

2. The satellite communication system of claim 1, wherein
the terminal antenna includes at least one of a single parabolic antenna, an electronically steered antenna, or a combination of a mechanically steered antenna and the electronically steered antenna.

3. The satellite communication system of claim 1, wherein
at least one of the terminal controller and the gateway controller includes a discard timer, and
at least one of the terminal controller and the gateway controller is configured to adjust the queue management policy by suspending the discard timer during the handover operation.

4. The satellite communication system of claim 1, wherein
at least one of the terminal controller and the gateway controller is configured to adjust the queue management policy by adjusting a queuing delay so that data packets are held for more time before being discarded during the handover operation.

5. The satellite communication system of claim 1, wherein
at least one of the terminal controller and the gateway controller is configured to readjust the queue management policy once the handover operation is complete.

6. The satellite communication system of claim 1, wherein
the terminal controller is configured to adjust the queue management policy at the user terminal during the handover operation.

7. The satellite communication system of claim 1, wherein
the gateway controller is configured to adjust the queue management policy at the gateway during the handover operation.

8. The satellite communication system of claim 1, wherein
at least one of the terminal controller and the gateway controller is configured to adjust the queue management policy using a discard time value that is specific to a data packet flow based on QoS.

9. A satellite communication method comprising:
determining that a user terminal should perform a handover operation from a first satellite to a second satellite;
sending a handover communication to the user terminal via the first satellite, the handover communication including instructions to perform the handover operation;
adjusting a queue management policy relating to transfer of data packets with the user terminal during the handover operation; and
establishing contact with the user terminal via the second satellite.

10. The method of claim 9, wherein
adjusting the queue management policy includes suspending a discard timer during the handover operation.

11. The method of claim 9, wherein
adjusting the queue management policy includes adjusting a maximum allowed queuing delay so that data packets are held for more time before being discarded during the handover operation.

12. The method of claim 9, wherein
the handover communication includes instructions for the user terminal to adjust a respective queue management policy at the user terminal.

13. The method of claim 9, wherein
the handover communication includes information regarding an activation frame for performing the handover operation.

14. The method of claim 9, comprising
readjusting the queue management policy after establishing contact with the user terminal via the second satellite.

15. A satellite communication method comprising:
receiving a handover communication from a gateway via a first satellite, the handover communication including instructions regarding a handover operation from the first satellite to a second satellite;
adjusting a queue management policy relating to transfer of data packets with the gateway during the handover operation; and
establishing contact with the gateway via the second satellite.

16. The method of claim 15, wherein
adjusting the queue management policy includes suspending a discard timer during the handover operation.

17. The method of claim 15, wherein
adjusting the queue management policy includes adjusting a maximum allowed queuing delay so that data packets are held for more time before being discarded during the handover operation.

18. The method of claim 15, wherein
the handover communication includes information regarding an activation frame for performing the handover operation.

19. The method of claim 15, comprising
readjusting the queue management policy after establishing contact with the gateway via the second satellite.

20. The method of claim 15, comprising
performing the handover operation by causing an antenna to point at the second satellite.

* * * * *